(12) United States Patent
Zeng

(10) Patent No.: US 11,731,491 B2
(45) Date of Patent: Aug. 22, 2023

(54) VEHICLE-MOUNTED SHADING DEVICE AND VEHICLE

(71) Applicant: Yaozong Zeng, Guangdong (CN)

(72) Inventor: Yaozong Zeng, Guangdong (CN)

( * ) Notice: Subject to any disclaimer, the term of this patent is extended or adjusted under 35 U.S.C. 154(b) by 621 days.

(21) Appl. No.: 16/957,380

(22) PCT Filed: Aug. 8, 2019

(86) PCT No.: PCT/CN2019/099773
§ 371 (c)(1),
(2) Date: Jun. 24, 2020

(87) PCT Pub. No.: WO2021/022545
PCT Pub. Date: Feb. 11, 2021

(65) Prior Publication Data
US 2023/0103226 A1    Mar. 30, 2023

(51) Int. Cl.
*B60J 3/00*   (2006.01)
*B60J 3/02*   (2006.01)
*B60J 11/08*  (2006.01)

(52) U.S. Cl.
CPC ............. *B60J 3/002* (2013.01); *B60J 3/0213* (2013.01); *B60J 11/08* (2013.01)

(58) Field of Classification Search
CPC ................................ B60J 3/002; B60J 3/0213
USPC ......................................................... 296/95.1
See application file for complete search history.

(56) References Cited

U.S. PATENT DOCUMENTS 7,172,233 B2 *  2/2007  Walker ....................... B60J 1/20
                                                    160/370.21
9,365,094 B2 *  6/2016  Salamon ................... B60J 1/025

FOREIGN PATENT DOCUMENTS

| CN | 2664292    Y | 12/2004 |
| CN | 201729049  U |  2/2011 |
| CN | 107253431  A | 10/2017 |
| KR | 2009 0002717 | * 3/2009 |

* cited by examiner

*Primary Examiner* — Joseph D. Pape

(57) ABSTRACT

Disclosed are a vehicle and a vehicle-mounted shading device thereof. The latter includes a housing, a water blocking and damping assembly, a visor and a driving mechanism. Due to the first water blocking and damping bar provided at the top edges of the transverse portion and the bending portion of the avoidance opening, the second water blocking and damping bar provided at the lower edge of the transverse portion of the avoidance opening, and the drainage plates provided at the inside of the two longitudinal portions of the avoidance opening, rainwater above the visor can be blocked by the first water blocking and damping bar, the water below the visor can be blocked by the second water blocking and damping bar, and the water blocked by the second water blocking and damping bar is drained downward by the drainage plate, preventing rainwater from entering the cavity.

12 Claims, 3 Drawing Sheets

VEHICLE-MOUNTED SHADING DEVICE AND VEHICLE

TECHNICAL FIELD

The present disclosure relates to vehicle-mounted auxiliary devices, in particular to vehicles and vehicle-mounted shading devices thereof.

BACKGROUND

Cars have entered ordinary families and most people choose driving them to go out after the rapid development of economy. During travel, sunny days or rainy days are regularly encountered. Accordingly, a shade cloth or a visor is generally fixed on the inside of the front windshield of a car and wipers on the outside of the front windshield to protect the sun and the rain.

There has been also a vehicle-mounted shading device with integrated sunshade and rain shielding in prior art, which is installed above the roof of the vehicle to keep out the sun and rain through an extended visor. An avoidance opening provided at the front end of the vehicle-mounted shading device includes the transverse portion and the bending portion of an avoiding visor and the longitudinal portion of an avoiding guideway. The guideway is provided with a connector connected to the visor, leading to a failure to seal the longitudinal portion, thereby allowing rainwater easily to enter the inner of the vehicle-mounted shading device. As a consequence, the service life of each interrelated component may be affected due to the accumulation of rainwater in the vehicle-mounted shading device.

SUMMARY OF THE INVENTION

According to a first aspect, a vehicle-mounted shading device provided in an embodiment may include:

a housing, wherein the housing is of a flat structure with a cavity, a mounting portion for mounting on the top of the vehicle is arranged on the bottom surface of the housing, an avoidance opening communicated with the cavity is arranged at the front end of the housing, the avoidance opening includes a transverse portion, a bending portion and a longitudinal portion, the transverse portion is arranged above the front end of the housing in the left-right direction, and both ends of the transverse portion are connected with the symmetrical bending portion, and the two ends of the transverse portion near the bending portion are connected to the symmetrical longitudinal portion;

a water blocking and damping assembly including a first water blocking and damping bar, a second water blocking and damping bar and two drainage plates, wherein the first and second water blocking and damping bars are elastic members, the first water blocking and damping bar is mounted at the upper edges of the transverse portion and the bending portion of the avoidance opening, the second water blocking and damping bar is mounted at the lower edge of the transverse portion of the avoidance opening, and each drainage plate is mounted at the inside of each corresponding longitudinal portion away from the bending portion;

a visor, wherein the visor is slidably installed in the cavity of the housing through a slideway, and the visor is provided with a shading position passing through the avoidance opening and a hidden position hidden in the cavity; and a driving mechanism installed in the cavity, wherein the output end of the driving mechanism is connected to the visor for driving the expansion and retraction of the visor.

Further, the drainage plate is inclined toward the longitudinal portion of the avoidance opening.

Further, the first and second water blocking and damping bars each include a clamping portion and a water blocking portion, the clamping portion is a U-shaped groove, the water blocking portion is a tubular structure, and the water blocking portion is connected to an end of the clamping portion away from the opening.

Further, the second water blocking and damping bar may further have a cushioning part connected to the outside of the clamping portion exposed out of the cavity.

Further, a plurality of protruded mounting portions are arranged at the bottom inside the cavity of the housing, and the slideway and the driving mechanism are respectively mounted on the mounting portions.

Further, a front baffle and side baffles inclined downward are respectively provided at the front end and both sides of the sunshade.

Further, the housing includes an upper cover, a bottom plate, and a water baffle, and the left and right sides and the rear end of the upper cover and the bottom plate are closed and connected, the upper cover and the bottom plate form the cavity with an opening at the front end, the water baffle is mounted on the bottom plate and located at the opening, and the avoidance opening are formed between the water baffle and the upper cover.

Further, a sunken first drainage channel is arranged at the position where the bottom plate connects with the upper cover.

Further, extending portions bent downward and extended are arranged at the left and right sides of the bottom plate, and lower edges of the extending portions are turned upward to form a second drainage channel.

Further, a diversion channel bent toward the front and bottom of the vehicle is arranged at the front end of the second drainage channel.

Further, the bottom plate is a curved structure with a high middle and low sides.

According to a second aspect, a vehicle having a vehicle body is provided in an embodiment. The vehicle further includes the aforesaid vehicle-mounted shading device, wherein the housing being mounted on the top of the vehicle body, and the avoidance opening faces toward the front of the vehicle body.

According to the vehicle and the vehicle-mounted shading device thereof in the above-mentioned embodiment, due to the first water blocking and damping bar provided at the top edges of the transverse portion and the bending portion of the avoidance opening, the second water blocking and damping bar provided at the lower edge of the transverse portion of the avoidance opening, and the drainage plates provided at the inside of the two longitudinal portions of the avoidance opening, rainwater above the visor can be blocked by the first water blocking and damping bar, the water below the visor can be blocked by the second water blocking and damping bar, and the water blocked by the second water blocking and damping bar is drained downward by the drainage plate, preventing rainwater from entering the cavity from the longitudinal portion of the avoidance opening, thereby improving the waterproof performance.

DETAILED DESCRIPTION OF THE EMBODIMENTS

Figure 1:
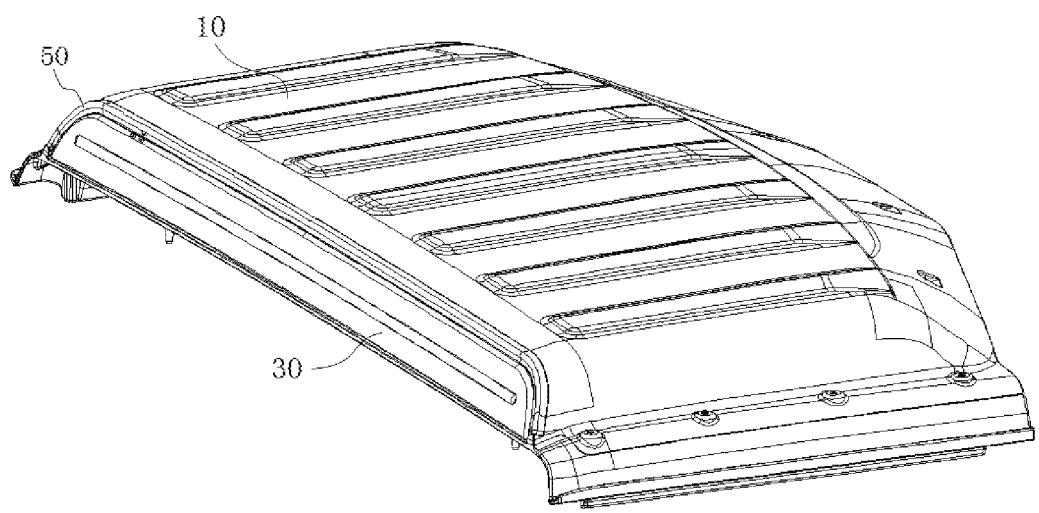
FIG. 1 is a schematically structural view of a vehicle-mounted shading device in a retracted state in an embodiment.

Common or similar elements are referenced with like or identical reference numerals in different embodiments. Many details described in the following embodiments are for the purpose of better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the field.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connected", "coupled" and the like here include direct and indirect connections (coupling) unless otherwise specified.

The present disclosure will be further described in detail below through specific embodiments with reference to the accompanying drawings. It should be noted that the front, rear, left, right, up or down directions in the embodiments are consistent with the front, rear, left, right, up or down directions of vehicles.

A vehicle-mounted shading device provided in one embodiment is installed on the top of a vehicle, working as shelter from rain or sun and offering a better driving experience.

The vehicle-mounted shading device in the embodiment may primarily include a housing 10, a slideway 20, a visor 30, a driving mechanism 40 and a water blocking and damping assembly 50, as shown in FIGS. 1 to 7.

Figure 5:
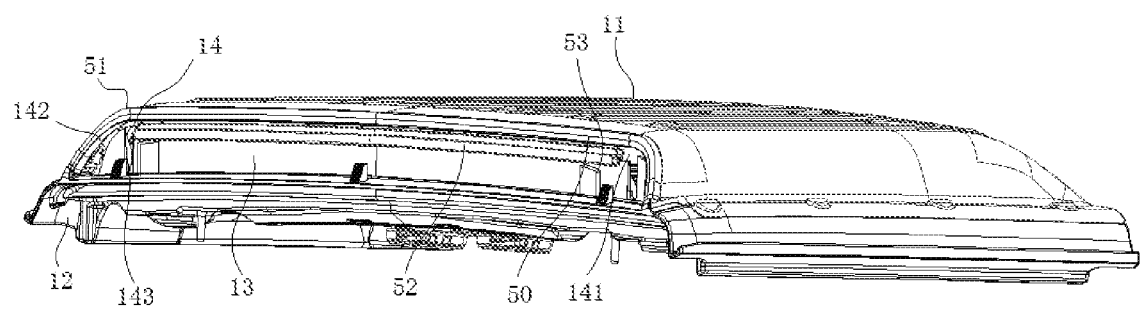
FIG. 5 is a schematically structural view of a housing in an embodiment.

As shown in FIG. 5, the housing 10 is in a flat structure. The housing 10 includes an upper cover 11, a bottom plate 12 and a water baffle 13. The left and right sides and the rear ends of the upper cover 11 and the bottom plate 12 are closed and connected. The upper cover 11 and the bottom plate 12 are provided with an opening at the front ends thereof respectively, resulting in a cavity having an opening formed together by the upper cover 11 and the bottom plate 12. The bottom surface of the bottom plate 12 is matched with the top of the vehicle. A mounting portion, including a bolt or a clamp or other fastening components, is arranged at the bottom surface of the bottom plate 12. The mounting portion can be detachably fixed to or welded to the top of the vehicle. The water baffle 13, installed at the opening between the upper cover 11 and the bottom plate 12, is fixedly connected to the bottom plate 12. An avoidance opening 14 is formed between the water baffle 13 and the upper cover 11. The avoidance opening 14 offers features of avoidance and guidance, and the visor 30 can be stretched out and drawn back through the avoidance opening 14.

The avoidance opening 14 includes a transverse portion 141, bending portions 142 and longitudinal portions 143. The transverse portion 141 is slightly curved and arranged above the front end of the housing 10 in the left-right direction. Both ends of the transverse portion 141 are symmetrically connected to the bending portion 142 which is bent downward. The longitudinal portions 143 are symmetrically connected to the two ends of the transverse portion 141 near the bending portion 142. The transverse portion 141 and the bending portion 142 are used to keep away from the visor 30, and the longitudinal portion 143 is used to shun the slideway 20 and a connector which are connected with the visor 30.

In other embodiments, the housing 10 may also be an integrated structure.

The water blocking and damping assembly 50 in the embodiment includes a first water blocking and damping bar 51, a second water blocking and damping bar 52 and a drainage plate 53. Both the first water blocking and damping bar 51 and the second water blocking and damping bar 52 are made of elastic rubber materials. The first and second water blocking and damping bars 51, 52 each include a clamping portion which includes a U-shaped groove and a water blocking portion which includes a hollow tube. Ribs are arranged at the sides of the inner of the U-shaped groove to improve the stability of clamping. The end of the clamping portion away from the opening is connected with the water blocking portion, and the clamping portion and the water blocking portion are integrally formed.

The first water blocking and damping bar 51 is installed at the upper edges of the transverse portion 141 and the bending portion 142 of the avoidance opening 14. When the upper cover 11 is protruded out of the water baffle 13 and the upper edges of the transverse portion 141 and the bending portion 142 are the lower surface of the upper cover 11, the first water blocking and damping bar 51 is directly mounted at the front edge of the upper cover 11 and always pressed against the upper surface of the visor 30 through the elastic deformation of the water blocking portion, so that the first water blocking and damping bar 51 can prevent water above the visor 30 from entering the cavity.

The second water blocking and damping bar 52 is installed at the lower edge of the transverse portion 141 of the avoidance opening 14, say, above the water baffle 13. The second water blocking and damping bar 52 can prevent rainwater under the visor 30 from entering the cavity. Meanwhile both the first and second water blocking and damping bars 51, 52 are used for buffering and damping.

The drainage plate 53 may be two pieces connected to both ends of the water baffle 13 and arranged inside the two longitudinal portions 143 of the avoidance opening 14, that is, one drainage plate 53 is arranged at the inside of one longitudinal portion 143 and the other drainage plate arranged at the inside of the other longitudinal portion. The two drainage plates 53 are symmetrically inclined, preferably the drainage plates 53 are inclined toward respectively corresponding longitudinal portion 143, that is, the two drainage plates 53 are inclined in opposite directions on both sides. The two drainage plates 53 are used to prevent rainwater under the visor 30 and rainwater scraped off by the second water blocking and damping bar 52 from entering the cavity through the bending portion 142 and the longitudinal portion 143 of the avoidance opening 14. Due to the arrangement of the drainage plate 53, it is not necessary to provide water blocking and damping bars on the inner side of the bending portion 142 and on both sides of the longitudinal portion 143, thereby simplifying the structure.

Figure 6:
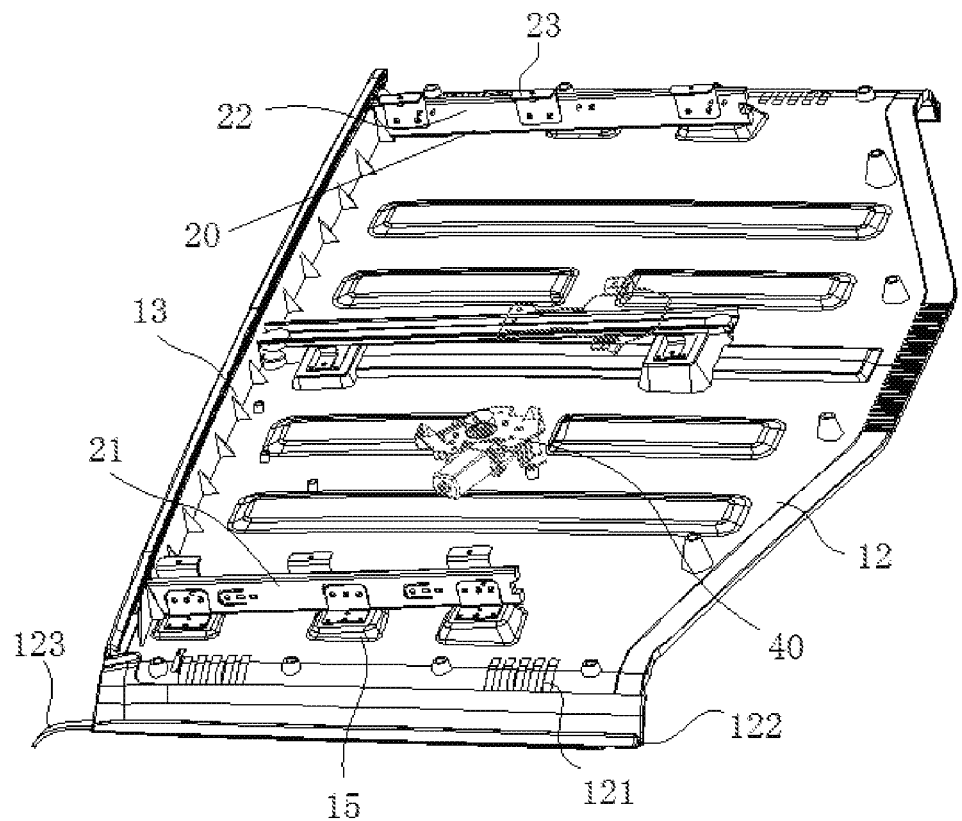
FIG. 6 is a diagram showing the inside of the housing in an embodiment.

The slideway 20 in the embodiment, as shown in FIG. 6, includes a first slideway 21 and a second slideway 22 which are fixed at both sides inside the cavity of the housing 10. The first and second slideways 21, 22 are installed at the upper surface of the bottom plate 12 in the front-rear direction. The first and second slideways 21, 22 have the same structure and both include a fixed track and a slide track. The fixed track is fixedly installed at the upper surface of the bottom plate 12 through an L-shaped connector 23. The opposite surfaces of the first and second slideways 21, 22 are provided with symmetrical slide grooves. The slide track is slidably installed in the slide groove of the fixed track. Balls are arranged at the upper and lower ends of the slide track and connected to the fixed track in a sliding joint. Channels are arranged at the upper and lower ends of the slide track, and corresponding channels are also arranged at the upper and lower ends of the slide groove. Balls are stuck in the channels of the slide and fixed tracks to offer sliding and act as a limit slide track, and the balls restricts the movement of the slide track in the left-right direction.

The first slideway 21 and the second slideway 22 in the embodiment are both two-section structures including a fixed track and a slide track, but the first and second slideways 21, 22 may also be a three-section structure in which a third slide track is mounted to the two-section structure in the same way. The three-section structure has two movable slide tracks, so that a larger extension stroke can be achieved under the same retraction size.

Figure 2:
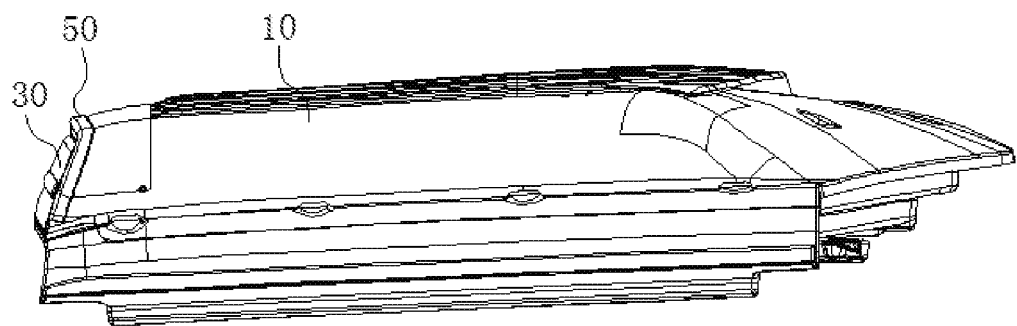
FIG. 2 is a side view of a vehicle-mounted shading device in a retracted state in an embodiment.
Figure 3:
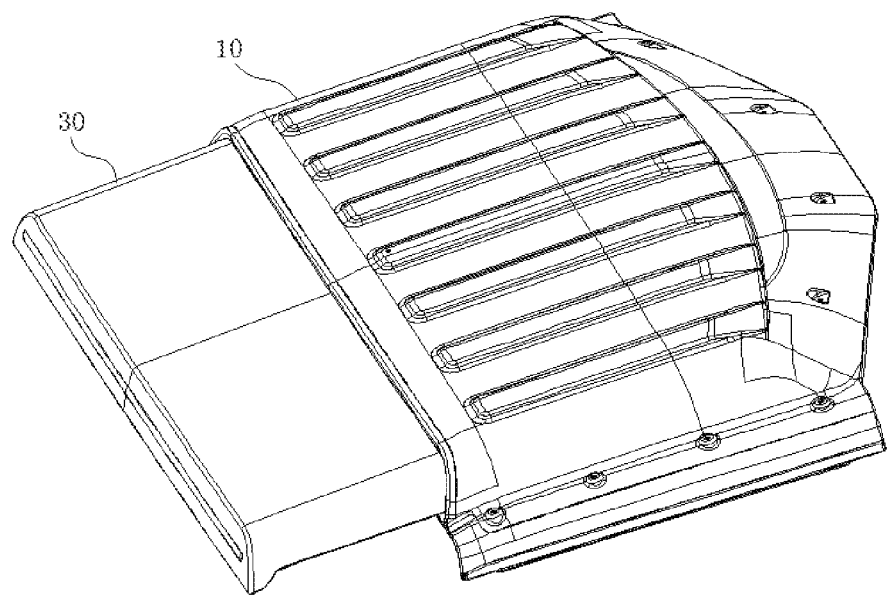
FIG. 3 is a schematically structural view of a vehicle-mounted shading device in an expanded state in an embodiment.
Figure 4:
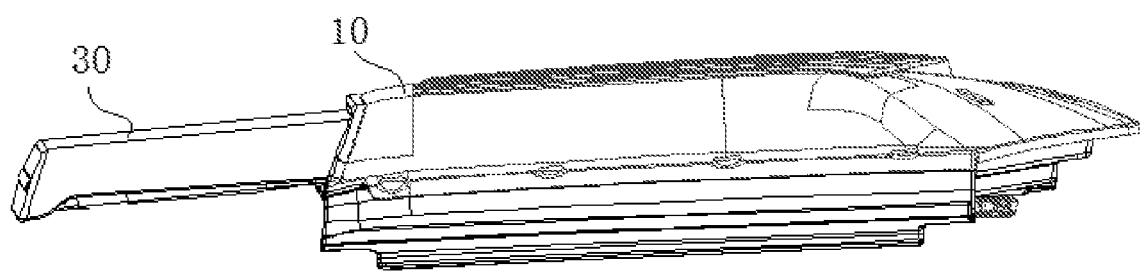
FIG. 4 is a side view of a vehicle-mounted shading device in an expanded state in an embodiment.
Figure 7:
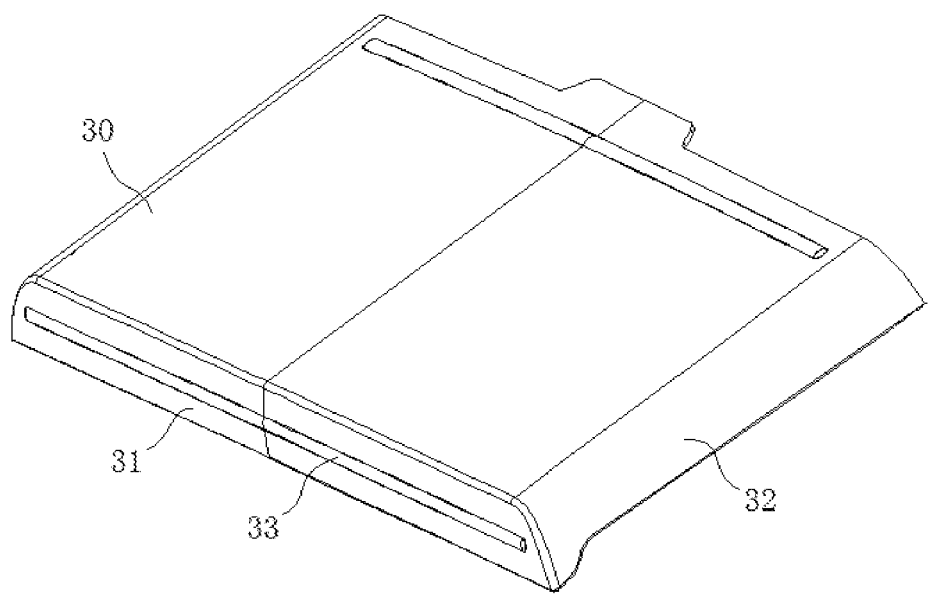
FIG. 7 is a schematically structural view of a visor in an embodiment.

The visor 30 in the embodiment is a colored transparent curved plate made of PC material as shown in FIG. 7. The visor 30 has the advantages of ultraviolet protection, anti-aging and the like. The lower surface of the visor 30 is connected to the slide tracks of the first and second slideway 21, 22. Since the slide tracks of the first and second slideway 21, 22 are stuck in the fixed track and only the sides thereof are exposed, the visor 30 is fixedly connected to the first and second slideway 21, 22 through an L-shaped connector 23, and the visor 30 and the slide tracks are fixedly connected to the connector 23 through screws, respectively. Specifically, the visor 30 is arranged in parallel with the first slideway 21 and the second slideway 22, and the middle and rear parts of the visor 30 are connected to the first and second slideways 21, 22, ensuring that the visor 30 has sufficient stroke. The front end and both sides of the visor 30 respectively have a front baffle 31 and a side baffle 32 that extend downward, and both the front baffle 31 and the side baffle 32 are inclined. The visor 30 is installed on the slideway 20, the front baffle 31 is always exposed out of the cavity of the housing 10, and other parts of the visor 30 can move through the avoidance opening 14 to the cavity of the housing 10. As shown in FIGS. 3-4, the visor 30 has a shading position exposed out of the housing 10, and as shown in FIGS. 1-2, the visor 30 has a hidden position hidden in the housing 10.

The second water blocking and damping bar 52 may further include a cushioning part for a better shockproof effect. The cushioning part is a hollow tube structure and it is connected to the side of the clamping portion of the second water blocking and damping bar 52. The side is exposed to the cavity, that is, the cushioning part is arranged outside of the cavity of the housing 10. When the visor 30 is retracted, the front baffle 31 of the visor 30 will abut against the cushioning part of the second water blocking and damping bar 52 to offer buffering and damping functions. The cushioning part of the second water blocking and damping bar 52 can be used to block water, and the cushioning part is protruded from the water baffle 13 to prevent rainwater from entering the avoidance opening 14.

The driving mechanism 40 in the embodiment is installed in the cavity of the housing 10, as shown in FIG. 6. The driving mechanism 40 is a rope-wheeled window regulator, a mature linear driving device in the prior art. The rope-wheeled window regulator mainly includes a motor, a rope, a driving track and a driving slider. The motor and the driving track are mounted on the bottom plate 12, the driving track is mounted between the first slideway 21 and the second slideway 22 and parallel to the first slideway 21 and the second slideway 22. Pulleys are arranged at both ends of the driving track. The rope is in a triangular shape and connected to the motor and the two pulleys. The driving slider is slidably installed on the driving slideway and is connected with the rope. The driving slider is fixedly connected with the lower surface of the visor 30, so that the motor drives the visor 30 to slide through the rope and the driving slider.

The driving mechanism 40 in other embodiments may also be a linear driving mechanism such as a linear cylinder or a linear motor.

As shown in FIG. 6, in one embodiment, a plurality of mounting portion 15 which are formed by protrusions of the bottom plate 12 are arranged in the cavity of the housing 10. The fixed track of the slideway 20 and the driving mechanism 40 are fixed on the mounting portion 15 respectively. The mounting portion 15 lifts the slideway 20 and the driving mechanism 40 to form a suspended structure in the cavity; accordingly, even if rainwater enters the cavity, it has no effect on the slideway 20 and the driving mechanism 40.

The bottom plate 12 is bent or curved in one embodiment, of which the middle of the bottom plate 12 is relatively higher than its left and right sides; therefore when rainwater enters the cavity, it can also be guided to the sides of the cavity to discharge, preventing water accumulation in the cavity.

As shown in FIG. 6, in one embodiment, a plurality of sunken first drainage channels 121 are arranged at the position where the bottom plate 12 connects with the upper cover 11, so that there is a drainage gap between the bottom plate 12 and the upper cover 11 and the rainwater in the cavity can be discharged through the first drainage channel 121.

Extending portions that extend completely downward are also arranged at both sides of the bottom plate 12. The lower edge of each extending portion is turned up to form a second drainage channel 122, and the second drainage channel 122 is used to collect rainwater discharged from the first drainage channel 121 and guide it to be discharged from the front and rear ends to prevent rainwater from flowing onto the side glass of the car.

In the embodiment, in order to prevent the water at the front end of the second drainage channel 122 from being discharged into the interior of the car when the door is opened, a diversion channel 123 bent toward the front and bottom of the vehicle is arranged at the front end of the second drainage channel 122. The bending of the diversion channel 123 is consistent with that of the front end of the vehicle's body, keeping the appearance fit. The diversion channel 123 and the second drainage channel 122 are of an integrated structure or a disassembled structure. The diversion channel 123 can be welded, fastening or screwing or the like to fix to the second drainage channel 122. When the connection therebetween is completed in an adhesive manner of which the diversion channel 123 is made of rubber or plastic material, the rear end of the diversion channel 123 may be inserted into the second drainage channel 122 to effectively avoid the problem of water inflow in the vehicle.

A vehicle is provided in one embodiment. The vehicle may be a sedan, pickup truck, or bus. The vehicle includes a vehicle body and the vehicle-mounted shading device in the foregoing embodiments. The vehicle-mounted shading device is integrally installed on top of the vehicle body. The mounting portion of the bottom plate 12 of the vehicle-mounted shading device is detachably mounted on the top of the vehicle body in a detachable manner such as using screws, or directly fixed on the top of the vehicle body by welding.

Since the vehicle is equipped with the vehicle-mounted shading device, the visor 30 can be extended during driving to keep out the sun and rain.

A control device provided with buttons in the cab can also be installed in the vehicle body to connect with the driving mechanism 40. Therefore the driver can control the expansion and retraction of the visor 30 through the buttons.

The principle and implementation manners of the present disclosure has been described above with reference to specific embodiments, which are merely provided for the purpose of understanding the present disclosure and are not intended to limit the present disclosure. It will be possible for those skilled in the art to make variations based on the principle of the present disclosure.

The invention claimed is:

1. A vehicle-mounted shading device, comprising:
a housing, the housing being of a flat structure with a cavity, a mounting portion for mounting on a top of the vehicle being arranged on a bottom surface of the housing, an avoidance opening communicating with the cavity being arranged at a front end of the housing, the avoidance opening including a transverse portion, two bending portions and two longitudinal portions, the transverse portion being arranged above the front end of the housing in a left-right direction, and each ends of the transverse portion being connected with one of the two bending portions which are arranged symmetrically, and each end of the transverse portion near respective bending portion being connected to one of the two longitudinal portions which are arranged symmetrically;
a water blocking and damping assembly including a first water blocking and damping bar, a second water blocking and damping bar and two drainage plates, the first and second water blocking and damping bars being elastic members, the first water blocking and damping bar being mounted at upper edges of the transverse portion and the two bending portions of the avoidance opening, the second water blocking and damping bar being mounted at a lower edge of the transverse portion of the avoidance opening, each drainage plate being mounted at an inside of each corresponding longitudinal portion away from respective bending portion;
a visor, the visor being slidably installed in the cavity of the housing through a slideway, the visor being provided with a shading position passing through the avoidance opening and a hidden position hidden in the cavity; and
a driving mechanism installed in the cavity, an output end of the driving mechanism being connected to the visor for driving the visor expanding and retracting.

2. The vehicle-mounted shading device according to claim 1, wherein the drainage plate is inclined toward the longitudinal portion of the avoidance opening.

3. The vehicle-mounted shading device according to claim 1, wherein the first and second water blocking and damping bars each include a clamping portion and a water blocking portion, the clamping portion is a U-shaped groove, the water blocking portion is a tubular structure, and the water blocking portion is connected to an end of the clamping portion away from the opening.

4. The vehicle-mounted shading device according to claim 3, wherein the second water blocking and damping bar further has a cushioning part connected to an outside of the clamping portion exposed out of the cavity.

5. The vehicle-mounted shading device according to claim 1, wherein a plurality of protruded mounting portions are arranged at a bottom inside the cavity of the housing, and the slideway and the driving mechanism are respectively mounted on the mounting portions.

6. The vehicle-mounted shading device according to claim 1, wherein a front baffle and side baffles inclined downward are respectively provided at a front end and both sides of the sunshade.

7. The vehicle-mounted shading device according to claim 1, wherein the housing includes an upper cover, a bottom plate, and a water baffle, and the left and right sides and the rear end of the upper cover and the bottom plate are closed and connected, the upper cover and the bottom plate form the cavity with an opening at the front end, the water baffle is mounted on the bottom plate and located at the opening, and the avoidance opening are arranged between the water baffle and the upper cover.

8. The vehicle-mounted shading device according to claim 7, wherein a sunken first drainage channel is arranged at the position where the bottom plate connects with the upper cover.

9. The vehicle-mounted shading device according to claim 8, wherein extending portions bent downward and extended are arranged at the left and right sides of the bottom plate, and lower edges of the extending portions are turned upward to form a second drainage channel.

10. The vehicle-mounted shading device according to claim 9, wherein a diversion channel bent toward the front and bottom of the vehicle is arranged at the front end of the second drainage channel.

11. The vehicle-mounted shading device according to claim 7, wherein the bottom plate is a curved structure with a high middle and low sides.

12. A vehicle, including a vehicle body, further comprising the vehicle-mounted shading device according to claim 1, the housing being mounted on the top of the vehicle body, and the avoidance opening faces toward the front of the vehicle body.

* * * * *